United States Patent [19]

Blech et al.

[11] Patent Number: 5,555,438

[45] Date of Patent: Sep. 10, 1996

[54] METHOD FOR SYNCHRONOUSLY TRANSFERRING SERIAL DATA TO AND FROM AN INPUT/OUTPUT (I/O) MODULE WITH TRUE AND COMPLEMENT ERROR DETECTION CODING

[75] Inventors: Steven P. Blech, Twinsburg; Kerry Van de Steeg, Chagrin Falls; Gerald S. Pepera, Mentor, all of Ohio

[73] Assignee: Allen-Bradley Company, Inc., Milwaukee, Wis.

[21] Appl. No.: 443,285

[22] Filed: May 18, 1995

Related U.S. Application Data

[63] Continuation of Ser. No. 967,948, Oct. 27, 1992, abandoned, which is a continuation of Ser. No. 734,842, Jul. 24, 1991, abandoned.

[51] Int. Cl.$^6$ .................................................. G06F 13/10
[52] U.S. Cl. .................... 395/850; 395/881; 395/200.17; 371/70; 364/DIG. 1; 364/221.9; 364/238.7; 364/271.1; 364/271.2; 364/271.4
[58] Field of Search ........................................ 359/113, 154, 359/158, 159; 370/24, 32; 371/57.1, 57.2, 70; 375/219, 220, 222; 395/200.13, 200.19, 881, 850, 550, 800; 455/73; 365/189.12

[56] References Cited

U.S. PATENT DOCUMENTS

| | | | |
|---|---|---|---|
| 3,823,401 | 7/1974 | Berg et al. | 343/204 |
| 3,937,882 | 2/1976 | Bingham | 370/24 |
| 3,979,676 | 9/1976 | Poma | 375/251 |
| 4,005,387 | 1/1977 | Herring et al. | 340/172.5 |
| 4,071,911 | 1/1978 | Mazur | 364/130 |
| 4,203,006 | 5/1980 | Mascia | 379/443 |
| 4,250,563 | 2/1981 | Struger | 395/800 |
| 4,328,583 | 5/1982 | Stodola | 371/63 |
| 4,366,478 | 12/1982 | Masuda et al. | 340/825 |
| 4,389,636 | 6/1983 | Riddle, Jr. | 341/71 |
| 4,413,319 | 11/1983 | Schultz et al. | 395/850 |
| 4,417,099 | 11/1983 | Pierce | 379/98 |
| 4,449,202 | 5/1984 | Knapp et al. | 395/775 |
| 4,502,143 | 2/1985 | Kato et al. | 371/57 |
| 4,516,236 | 5/1985 | Hadziomerovi | 370/24 |
| 4,523,322 | 6/1985 | Abbiate | 375/36 |

(List continued on next page.)

OTHER PUBLICATIONS

Stallings, William, "Data and Computer Communications" (MacMillan 1988), p. 107.
Xilinx Programmable Gate Array Company, 1989, "Xilinx, The Programmable Gate Array Data Book", pp. 1–3 to 1–6.
Allen–Bradley Company, Inc., Publication 1746–1.1, May, 1989, "SLC™500 Programmable Controller".
Allen–Bradley Company, Inc., Publication 1747–2.30, Apr. 1991, "SLC 500 Family of Small Programmable Controllers".
Allen–Bradley Company, Inc., Publication 1746–3.0, Apr. 1991, "SLC™500 Programmable Controller:," Bulletin 1746, 1747.
Pepera, et al., U.S. Ser. No. 07/580716 specification and drawings.
Publication 1746–2.30, Nov. 1990 "IMC 110 Motion Control System" Allen–Bradley Company, Inc.

*Primary Examiner*—Lance L. Barry
*Attorney, Agent, or Firm*—Keith M. Baxter; John M. Miller; John J. Horn

[57] ABSTRACT

An industrial controller Input/Output module includes onboard processing circuitry in the form of a microprocessor and associated memory, a first programmable logic circuit and a second programmable logic circuit connected through an isolation interface. The isolation interface is comprised of optical coupling circuits. The programmable logic circuits are programmed to provide circuitry for parallel-to-serial data conversion of 24 bits of system Input/Output data on each side of the isolation interface. The data is then transferred as serial data in both directions at once in response to a shift clock signal. The data signals and the shift clock signal utilize three one-bit optical coupling devices in the isolation interface. After transfer across the isolation interface, the system Input/Output data is converted to parallel data for further processing.

2 Claims, 9 Drawing Sheets

U.S. PATENT DOCUMENTS

| | | | |
|---|---|---|---|
| 4,596,048 | 6/1986 | Dunki-Jacobs | 455/602 |
| 4,636,790 | 1/1987 | Diamond | 340/825.52 |
| 4,638,167 | 1/1987 | Leseure et al. | 250/551 |
| 4,682,334 | 7/1987 | Le Mouel et al. | 371/55 |
| 4,691,296 | 9/1987 | Struger | 395/882 |
| 4,771,403 | 9/1988 | Maskovyan et al. | 395/834 |
| 4,901,275 | 2/1990 | Hardie et al. | 395/889 |
| 4,912,712 | 3/1990 | Yamada | 371/57.2 |
| 4,949,333 | 8/1990 | Gulick et al. | 370/24 |
| 4,965,793 | 10/1990 | Polzin et al. | 370/94.1 |
| 4,973,943 | 11/1990 | Arima | 340/506 |
| 5,039,194 | 8/1991 | Buck et al. | 383/88 |
| 5,042,037 | 8/1991 | Endoh | 371/57.1 |
| 5,051,899 | 9/1991 | Ikoma et al. | 364/405 |
| 5,055,842 | 10/1991 | Mueller | 341/100 |
| 5,119,380 | 6/1992 | Ohwada et al. | 371/57.2 |
| 5,267,251 | 11/1993 | Lenuir et al. | 371/57.2 |
| 5,325,376 | 6/1994 | Ushio et al. | 371/57.1 |

METHOD FOR SYNCHRONOUSLY TRANSFERRING SERIAL DATA TO AND FROM AN INPUT/OUTPUT (I/O) MODULE WITH TRUE AND COMPLEMENT ERROR DETECTION CODING

This is a continuation of application Ser. No. 07/967,948 filed Oct. 27, 1992 now abandoned, which is a continuation of Ser. No. 07/734,842 filed Jul. 24, 1991 now abandoned.

BACKGROUND OF THE INVENTION

1. Field of the Invention

The field of the invention is digital controllers for controlling a machine, an assembly line or a process. More particularly, the invention relates to Input/Output (henceforth "I/O") modules for controlling output devices and monitoring input devices on a controlled machine or system.

2. Description of the Background Art

Programmable controllers are employed in many industrial and commercial applications to control the operation of various machines and processes. They fall into the broad category of real-time sampled data systems. In a certain maximum time, inputs are read, controlling equations are applied, and actuator outputs are provided. Besides controlling switching devices, these controllers also control closed loop servo devices by generating analog output signals and by reading encoded feedback signals and comparing actual position to desired position.

Controllers generally have a modular construction with some type of system processor module and a number of I/O modules for connection to the I/O devices on a controlled machine or process. The modules are often supported in a chassis and plugged into a backplane circuit board for electrical interconnection and communication.

It is typical to provide an isolation interface in I/O modules to physically and electrically isolate 120-volt alternating current (henceforth "AC") signals or 24-volt direct current (henceforth "DC") signals, for example, on the machine side of the controller, from the 5-volt logic-level signals within the controller electronics. This electrical isolation is typically accomplished with optical coupling circuits. With optical coupling, an overcurrent or fault on the machine side of the I/O module is isolated from the controller electronics.

Techniques for utilizing isolation interfaces in I/O modules have been previously disclosed in Maskovyak et al., U.S. Pat. No. 4,771,403, issued Sep. 13, 1988, and in Pepera et al., U.S. Ser. No. 07/580,716 now abandoned, both of which are assigned to the assignee of the present invention.

In Maskovyak et al., data is transmitted across an isolation interface as serial data, but in only one direction in an individual I/O module. In Maskovyak et al., four bits of address are transmitted in parallel across the isolation interface to retrieve each bit of serial data. In total, the isolation interface is six bits wide with five bits being needed for one-way data transfer.

In Pepera et al., a stream of serial data bits is associated with two bits for timing signals, so that that three bits are required to transfer data in one direction. Pepera et al. has been extended to two-way communication with three parallel bits being needed for transfer of serial data in each direction.

SUMMARY OF THE INVENTION

The invention provides an I/O module with a serial data ring in which serial data is transmitted across an isolation interface in both directions at once in response to a shift clock signal. This requires only a three-bit wide interface for the two-way data transfer, allowing three other bits to be used for other timing and control signals.

The invention is incorporated in an I/O module having a first integrated circuit for communicating system input data to a processor and for receiving system output data from a processor, having an isolation interface, and having a second circuit coupled through the isolation interface to the first circuit.

The first circuit is a programmable logic circuit which includes a first shift register, circuitry for loading a plurality of parallel bits of system output data into the first shift register, and a timing circuit for transmitting a shift clock signal to the first shift register to transfer the serial output data across the isolation interface to the second circuit. The shift clock signal is also transmitted across the isolation interface to the second integrated circuit, which also receives and stores the serial output data.

The second circuit is a programmable logic circuit which includes a second shift register and circuitry for loading a plurality of parallel bits of system input data into a second shift register. The second shift register is responsive to the shift clock signal from the first programmable logic circuit for transmitting the system input data across the isolation interface to the first circuit as serial input data, where circuitry is provided for receiving serial input data and storing it for further transfer as parallel system input data.

Although a pair of large scale integration (LSI), programmable logic circuits are advantageously used to incorporate the various circuits required on opposite sides of the isolation interface, other circuits can be used without departing from the scope of the invention.

And although the invention is advantageously applied in a programmable controller I/O module for controlling motion and for communicating I/O data with a controller processor through a backplane, the invention is applicable to other types of I/O modules.

The invention provides further advantages in the specifics of the ring data transfer as shall be described and claimed herein.

Other objects and advantages, besides those discussed above, shall be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENTS

Figure 1:
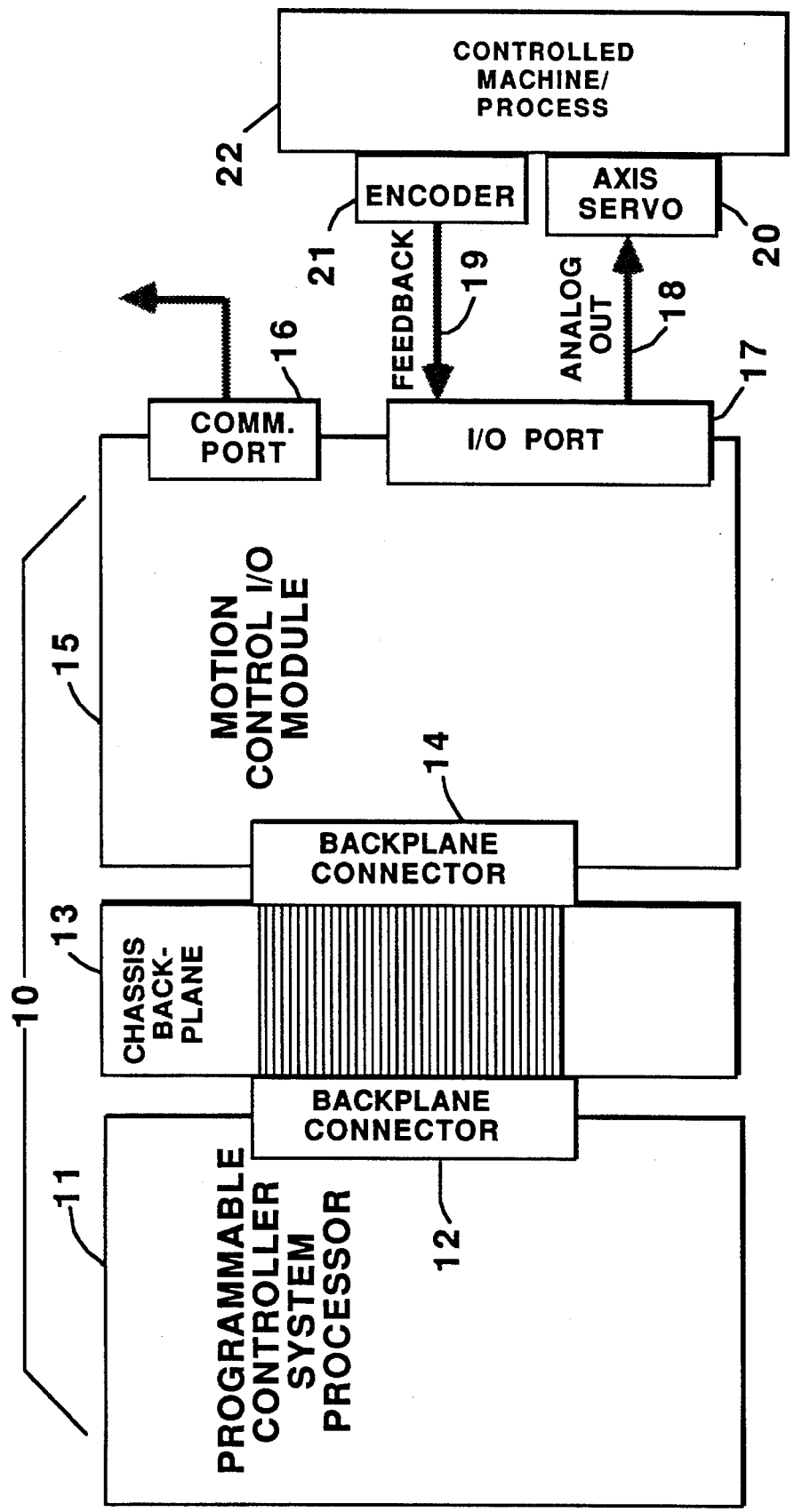
FIG. 1 is a diagram of a modular programmable controller with an I/O module that incorporates the present invention.

The invention is incorporated in a motion control I/O module 15 shown in FIG. 1, which is used in a programmable controller 10 to control a machine or process 22.

Programmable controllers generally have a PC system processor 11 which may be inserted in a left-most slot in an equipment chassis (not shown) that holds I/O module 15 in an adjacent slot. The processor 11 and I/O module 15 have been laid flat for view in two dimensions. The PC system processor 11 is inserted into backplane connector 12 to communicate with the I/O module 15 through an equipment chassis backplane 13 and I/O module backplane connector 14.

Alternatively, an I/O communication adapter module may occupy the position of the PC system processor 11. The adapter module then communicates with the I/O modules, including module 15, through the equipment chassis backplane 13. Examples of the two types of programmable controller systems just described are shown in Struger, U.S. Pat. No. 4,250,563, issued Feb. 10, 1981.

The PC processor 11 exchanges system I/O data with the I/O module 10 to control a machine or process 22. System I/O data includes "discrete" I/O data which represents the ON/OFF states of groups of single-signal devices. System I/O data also includes word-oriented output data including commands and parameters for an axis servo drive 20 and status data returned from the I/O module 15. System I/O data is converted to and from signals for controlling equipment in real time and for monitoring the status of that equipment.

The I/O module 15 is a motion control I/O module which is inserted in a slot in an equipment chassis. The module 15 has two connectors 16, 17 on the front. A telephone-style connector 16 provides a communication port by which the I/O module 15 is connected to a handheld pendant station (not shown) or a programming terminal (not shown). A 25-pin I/O port connector 17 is electrically connected through a cable that includes analog output lines 18 and feedback input lines 19 connected to an axis servo drive 20 and an encoder device 21, respectively. The encoder device 21 is preferably a differential incremental encoder with markers. For general functional specifications for the I/O module 15, reference is made to Publication No. 1746-2.30 of Allen-Bradley Company, Inc., November, 1990, which is incorporated herein by reference.

Motion control programs are developed using the programming terminal and then loaded into a program RAM (44 in FIG. 3) within the I/O module 15. The handheld pendant is conveniently used to make modifications in fine tuning the program. The programming terminal and handheld pendent communicate through the connector 16 and UART 54 seen in FIG. 3.

Figure 2:
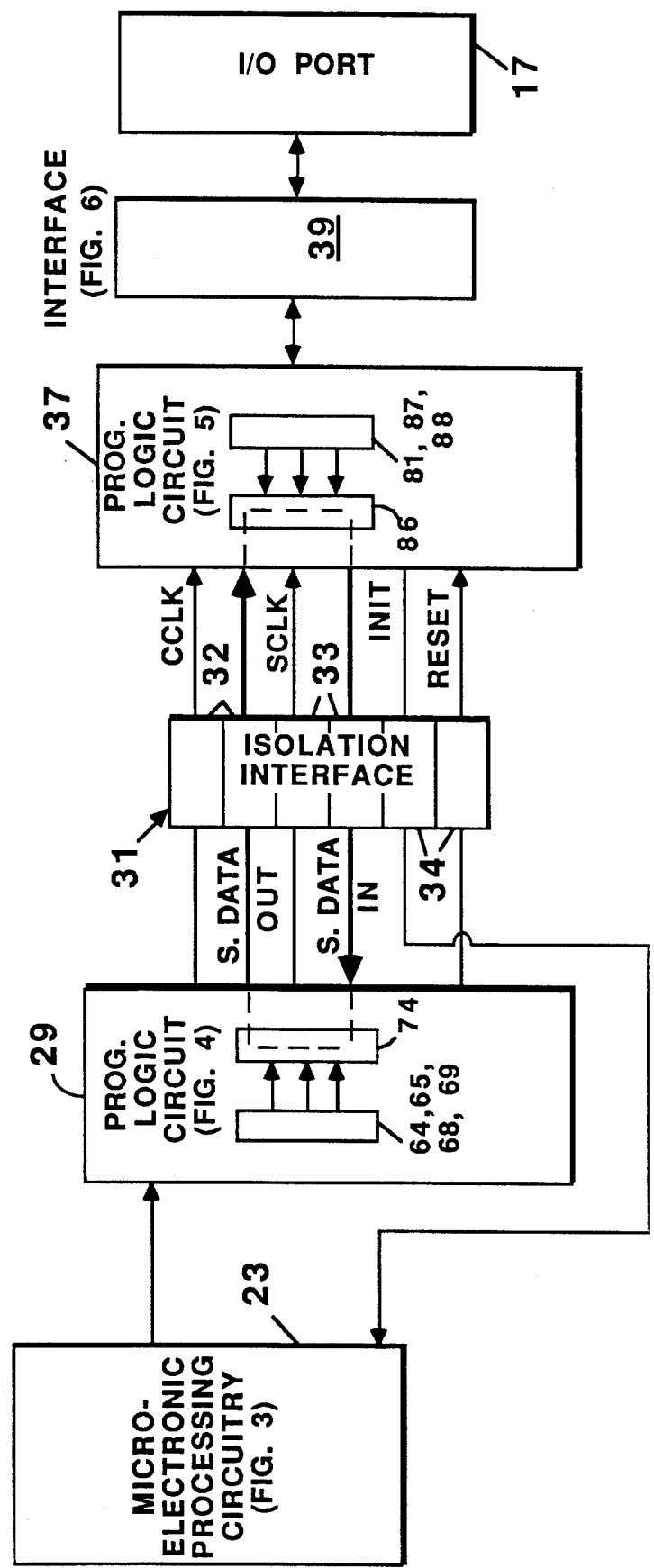
FIG. 2 is a block diagram of the I/O module which incorporates the present invention.
Figure 3:
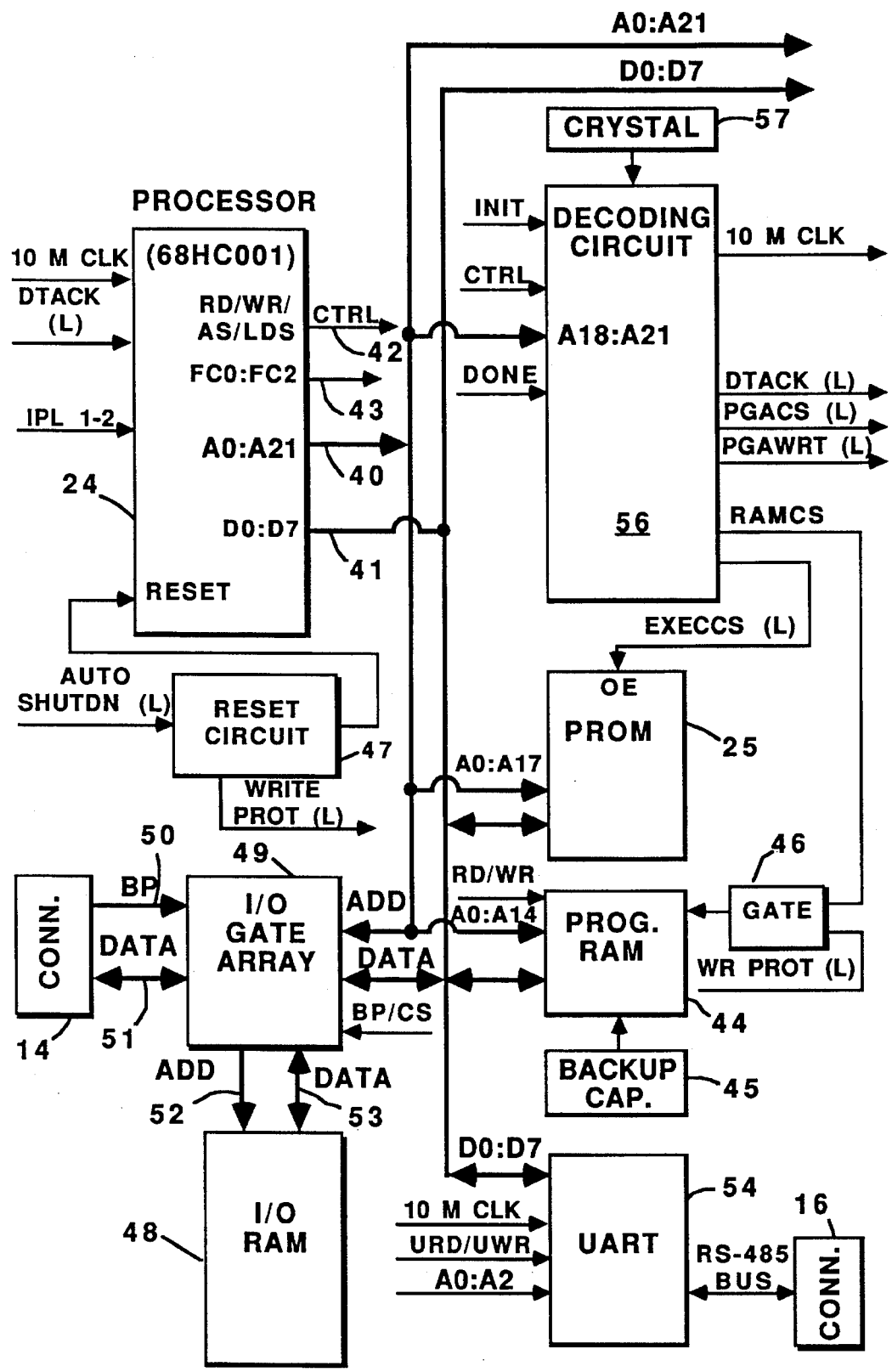
FIGS. 3–6 are block diagrams of the circuitry included in the I/O module of FIGS. 1 and 2.

As seen in FIG. 2, the I/O module 15 has on-board processing circuitry 23. As shown in FIG. 3, this circuitry 23 includes a microelectronic processor 24 and a programmable read only memory (PROM) 25. The PROM 25 stores configuration data, program instructions for configuration operations, and program instructions for module operations after configuration. After power up, the processor 24 executes the configuration instructions stored in the PROM 25 to read a first portion of configuration data from the PROM 25 and to write the configuration data as a byte stream to a first programmable logic circuit 29 seen in FIG. 2. When all of the configuration data applicable to circuit 29 has been received, the remaining portion of configuration data is read from memory 25 and written to programmable logic circuit 29 as a second byte stream. From there the data is passed as a bit stream of serial data through an isolation interface 31 to a second programmable logic circuit 37. The second programmable logic circuit 37 is connected through interface circuitry 39 to the I/O port 17 described earlier in relation to FIG. 1.

For further description of the configuration operations, reference is made to a copending application, entitled "Soft-Configuration I/O Module for a Machine or Process Controller", filed on even date herewith. To the extent that application adds to the description herein, it is hereby incorporated by reference.

The circuits 29, 37 seen in FIG. 2 include static memory cells which control the logic configuration of configurable logic blocks (CLB's), I/O blocks (IOB's) and interconnection resources. A configurable logic block includes a combinational logic section, two flip-flops and a memory-controlled multiplexer section. An I/O block includes input and output storage elements and certain I/O functions which can be controlled by the static memory cells. The interconnection resources connect the CLB's and IOB's in logical networks. For a description of the internal construction and general methods of configuration of circuits 29, 37, reference is made generally to "The Programmable Gate Array Data Book", Xilinx, Inc., 1989, and more particularly to pages 2-1 to 2-54.

The programmable logic circuits 29 and 37 are coupled for communication through three pairs of optical coupling circuits 32, 33 and 34. One optical coupling circuit in each pair 32, 33 and 34 is used for each signal path across the isolation interface. The signal paths are CCLK/ENC-CLK, SCLK, S. DATA OUT, S. DATA IN, INIT and MASTER RESET/CLEAR, which will be explained in more detail below. Configuration data, and later, system I/O data, are transmitted across the interface in a serial stream rather than as parallel data to minimize the number of optical coupling circuits 32, 33 and 34.

The optical coupling circuits 32, 33 and 34 provide physical and electrical isolation between the controller electronics and the controlled machine or process 22 seen in FIG. 1, while at the same time coupling signals by optical means between the controlled machine or process and the controller side of the isolation interface 31. One pair of the optical coupling circuits 32 provides a shorter propagation delay than the others. Propagation delays for these two opto channels must be less than or equal to 173 nanoSeconds (nSec), or, if propagation delay tracking between the circuits 32 can be guaranteed, the maximum difference in propagation delays must also be less than or equal to 173 nSec. Commercial circuits suitable for this purpose are HCPL 2232 circuits offered by Hewlett-Packard, Palo Alto, Calif. These circuits 32 have a propagation delay of 300 nSec maximum but track within 130 nSec of each other, since they are in the same physical package. Commercial circuits suitable for use as the other optical coupling circuits 33, 34 are HCPL 2531 offered by Hewlett-Packard, Palo Alto, Calif.

The data path labeled "S. DATA OUT" in FIG. 2 transmits the configuration data in serial form to the second programmable logic circuit 37 where it is stored. The first configuration circuit 29 counts the number of bytes of configuration data to be transferred to both programmable circuits 29, 37. When all the configuration data has been transferred to the two circuits, 29, 37, a DONE signal is returned by the first programmable logic circuit 29 to the on-board processing circuitry 23 (specifically the decoding circuit 56 in FIG. 3) to confirm that the I/O module 15 has been configured. The decoding circuit 56 then switches addressing from a configuration memory map to a post-configuration memory map.

FIG. 3 shows further details of the on-board processing circuitry 23. The microelectronic processor 24 is preferably the Model 68HC001 available from Motorola Semiconductor of Phoenix, Ariz. and Austin, Tex. For information about the internal circuitry, instruction set, programming and operation of this processor reference is made to the commercial literature available from the manufacturer.

The processor has a twenty-four bit address space in which outputs A0:A21 connect to an address bus 40. The processor also connects to a 8-bit external data bus 41 through data outputs D0:D7. Control lines for memory read (RD), memory write (WR), address strobe (AS) and lower data strobe (LDS) signals are included in a control bus 42. Function code signals are transmitted from outputs FC0:FC2 on function code lines 43.

The processor 24 is connected through lines A0:A17 of the address bus 40 and through the data bus 41 to the PROM 25 identified in FIG. 2. The PROM stores up to 128k bytes of information and can be replaced with a new PROM when it is desired to change the configuration and operation of circuits 29, 37. The processor 24 also connects through lines A0:A14 of the address bus 40 and through the data bus 41 to a 32k-byte program random access memory (henceforth "RAM") 44. This RAM 44 is used for, among other things, storage of the user motion control program. A backup capacitor circuit 45 connects to the RAM 44 and a large capacitor in the circuit 45 is charged during normal operation. This circuit 45 then provides a small discharge current during periods of power down to preserve the contents of the program RAM 44. A write protect circuit is also provided by a two-input NAND gate 46 with its output pulled high and with a chip select signal RAMCS and a write protect signal WR PROT (L) as input signals. The gate 46 blocks access to the RAM 44 when WR PROT (L) is low true as determined by a reset circuit 47.

The circuitry in FIG. 3 also includes an I/O RAM 48 with a storage capacity of 8k bytes for data. This is dual-ported RAM which stores I/O data that is transferred between the processor 24 and the system processor 11 in 8-byte files. For more information on the nature of the data in these files, reference is made to the literature available from Allen-Bradley Company, Inc. on the SLC™ 500 Family of Programmable Controllers. Access to the shared RAM 48 is controlled through an I/O gate array circuit 49. The processor 24 connects to the I/O gate array circuit 49 through the address bus 40 and the data bus 41. The backplane 13 in FIG. 1 is electrically connected to the I/O gate array circuit 49 through a backplane control (BP) bus 50 and a backplane data bus 51. The two sets of buses 40–41 and 50–51 are alternately connected by circuit 49 to the local address bus 52 and data bus 53 of the I/O RAM 44.

To gain access the through the backplane the PC system processor 11 generates an access request interrupt signal to the processor 24. The processor 24 will direct the gate array 49 to connect buses 50 and 51 to the I/O RAM 48 and will return an access grant signal to the PC system processor 11 through the backplane connector 14. After I/O transfer to the RAM 48, the PC system processor 11 transmits an access release signal through the backplane to the processor 24 and the I/O RAM will be reconnected to buses 40 and 41 through gate array 49.

The processor 24 also communicates through lines A0:A2 of the address bus 40 and the data bus 41 with a universal asynchronous receiver and transmitter (henceforth "UART") 54. The UART 54 connects to the communication port 16 through 75ALS176 transceivers (not shown) and lines 55 carrying the signals specified by the RS-485 standard. Also connected to the UART 54 are the URD and UWR lines to control the direction of data flow. The UART 54 converts between serial data received through the port 16 and parallel data communicated on lines D0:D7 of the data bus 41.

The processor 24 activates various circuits on the module 15 through a decoding circuit 56. A crystal 57 supplies timing signals to the decoding circuit 56 which are divided by two and then transmitted to the processor 24 through a 10M CLK line at a frequency of 10 MHz. The 10M CLK line also supplies clock signals to the UART 54 and to the first programmable logic circuit 29.

The processor 24 connects to the decoding circuit 56 through lines A18:A21 of the address bus 40 and through the control bus 42. Signals on these lines are decoded to enable the PROM 25 through the EXECCS (L) line and to enable the RAM 44 through the RAMCS line. Signals on these lines are also decoded to enable the first programmable logic circuit 29 for data transfer operations through the PGACS(L) and PGAWRT(L) lines.

The decoding circuit 56 also provides the DTACK (L) signal to the processor 24 during read and write cycles to the PROM 25 and RAM 44 and, during configurations operations, to the first programmable logic circuit 29.

Figure 4:
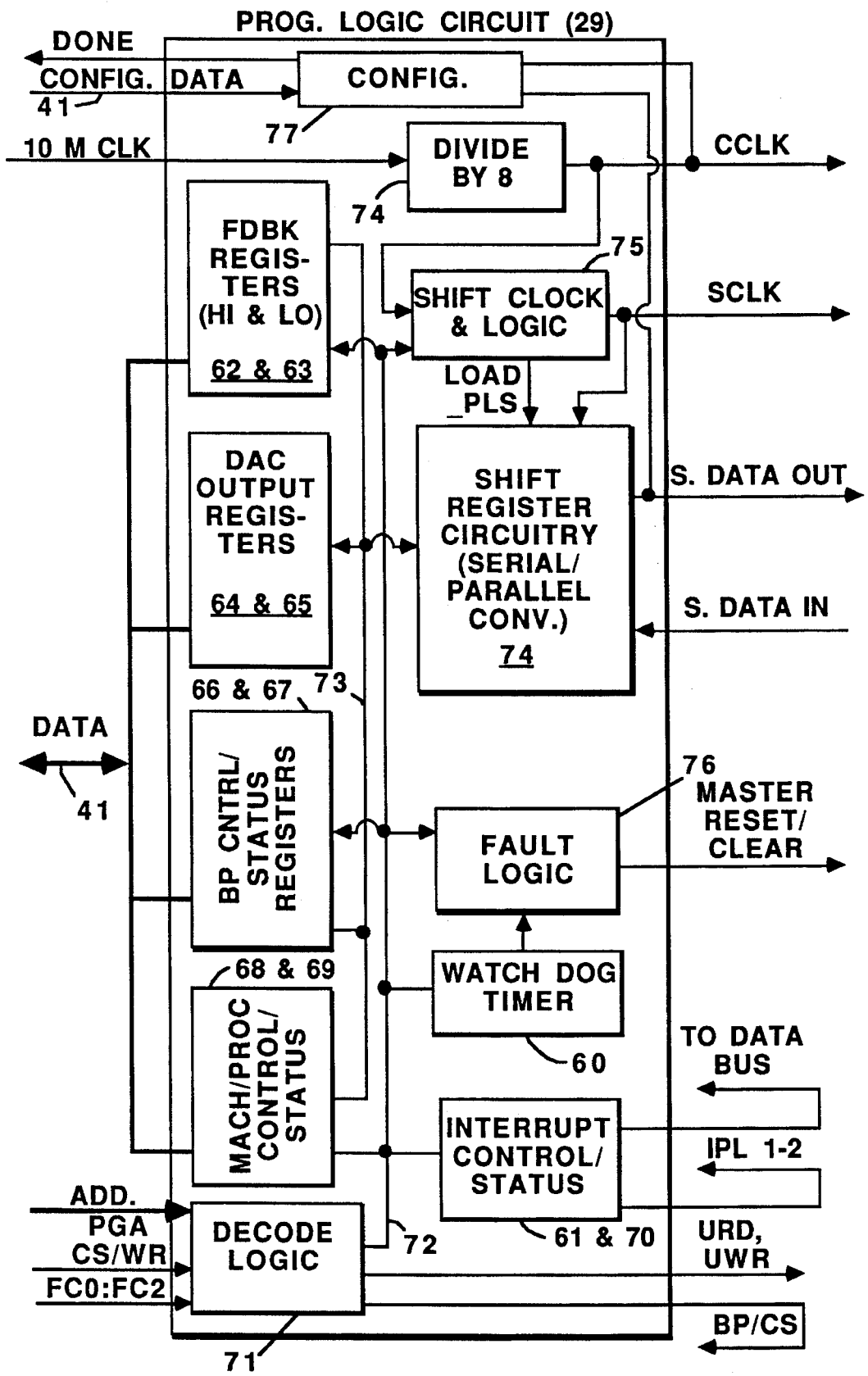

The first programmable logic circuit 29 is configured by the configuration data to perform the discrete circuit functions seen in FIG. 4. These include a group of registers which send and receive data, as applicable, to and from the processor 24 through the data bus 41. These registers include a watchdog timer register 60, interrupt control/status registers 61, 70, two feedback registers 62, 63 for input data from the encoder, two digital-to-analog output registers 64, 65 for data that is converted to analog output signals going to the servo drive, backplane control/status registers 66, 67 and machine/process control/status registers 68, 69. These registers are defined in the Tables 1–4 below.

In the configuration memory map, information is read from the PROM 25 at addresses 00000 (hex) to 3FFFF (hex). In the configuration memory map, configuration data is written to the first programmable logic circuit 29 in a range of addresses from 80000 (hex) to BFFFF (hex). After configuration, data is still read from the PROM at addresses 00000 (hex) to 3FFFF (hex). However, in the post-configuration memory map, data is read from and written to registers in the first programmable logic circuit 29 (after the DONE signal is received at circuit 56) as shown in the following Tables 1–4.

In the post-configuration memory map, information is written to or read from RAM 44 in an address range from 40000 (hex) to 7FFFF (hex). In the post-configuration memory map, the UART 54 is addressed in a range from A0000 (hex) to AFFFF (hex) and the I/O RAM 48 and backplane are addressed through gate array 49 in a range from B0000 (hex) to BFFFF (hex).

TABLE 1

Byte-Oriented Registers in Circuit 29

| Ref. | Resister | Address (hex) | Bit | Description |
|---|---|---|---|---|
| 60 | WATCHDOG TIMER | 94000 (WRITE) | 0–7 | Any data written to this address retriggers watchdog |
| 61 | INT CONTROL | 90000 (WRITE) | 0–7 | Any data written to this address enables |

TABLE 1-continued

Byte-Oriented Registers in Circuit 29

| Ref. | Resister | Address (hex) | Bit | Description |
|---|---|---|---|---|
| 62 | FEEDBACK HI | 98000 (READ) | 0–3<br>4–7 | interrupts<br>High Nibble, Feedback data<br>Not Used |
| 63 | FEEDBACK LO | 9C000 (READ) | 0–7 | Low Byte, Feedback data |
| 64 | DAC HI | 98000 (WRITE) | 0–3<br>4–7 | High Nibble, Analog Out<br>Not Used |
| 65 | DAC LO | 9C000 (WRITE) | 0–7 | Low Byte, Analog Out |

TABLE 2

Backplane Registers in Circuit 29

| Ref. | Register | Address (hex) | Bit | Description |
|---|---|---|---|---|
| 66 | BACKPLANE CONTROL | 84000 (WRITE) | 0<br>2<br>3<br>6<br>7<br>1, 4, 5 | Shutdown<br>Access Shared I/O RAM<br>Turn on LED 1<br>Turn on LED 2<br>Test mode for INT's<br>Not used |
| 67 | BACKPLANE STATUS | 88000 (READ) | 0<br>1<br>4<br>5<br>2, 3, 6<br>7 | 0 = I/O RESET<br>0 = CLOCK > 10 MHz.<br>1 = Restart Watchdog<br>0 = Watchdog disabled<br>Not used |

TABLE 3

Machine/Process Registers in Circuit 29

| Ref. | Resister | Address (hex) | Bit | Description |
|---|---|---|---|---|
| 68 | MACH/PROC CONTROL | 80000 (WRITE) | 2<br>3<br>4<br>5<br>6<br>0, 1, 7 | Z FND EN (1 = enable marker detect) LVL Z EN<br>(1 = enable counter reset)<br>CRST (1 = reset counters)<br>ESTOP CMD (1 = Close relay)<br>FOUT (1 = ON)<br>Not used |
| 69 | MACH/PROC STATUS | 94000 (READ) | 0<br>1<br>2<br>3<br>4<br>5<br>6<br>7 | MRKR FOUND (1 = marker detect)<br>FIN 1 (1 = +24 V, 0 = 0V)<br>FIN 2 (1 = +24 V, 0 = 0V)<br>FIN 3 (1 = +24 V, 0 = 0V)<br>ESTOP RELAY (0 = Open)<br>ESTOP RESET REQUEST (1 = true)<br>ESTOP STATUS (1= String Closed)<br>Not Used |

TABLE 4

Interrupt Status Register in Circuit 29

| Ref. | Register | Address (hex) | Bit | Description |
|---|---|---|---|---|
| 70 | INTERRUPT STATUS | 8C000 (READ) | 0<br>1<br>2<br>3<br>4<br>5<br>6<br>7 | 1 = Real Time Int<br>1 = Sample Period Int<br>1 = UART Int<br>1 = Backplane Read Done<br>1 = Backplane Write Done<br>1 = Power fault<br>1 always<br>1 = Test Mode Bit |

In FIG. 4, a decode logic circuit 71 decodes various signals to enable the registers described above, through an internal control bus 72. The registers are connected by an internal data bus 73 to shift register circuitry 74 which converts between parallel data communicated with the processor and serial data sent across the isolation interface. Signals are received by the decode logic circuit 71 through the address bus, the PGACS and PGAWRT lines and the function code lines FC0:FC2, all of which connect to a decode logic circuit 71. The decode logic circuit 71 decodes certain address signals to generate the URD and UWR signals to the UART 54 and other signals to generate the BP/CS enable signal to the gate array 49.

Figure 5:
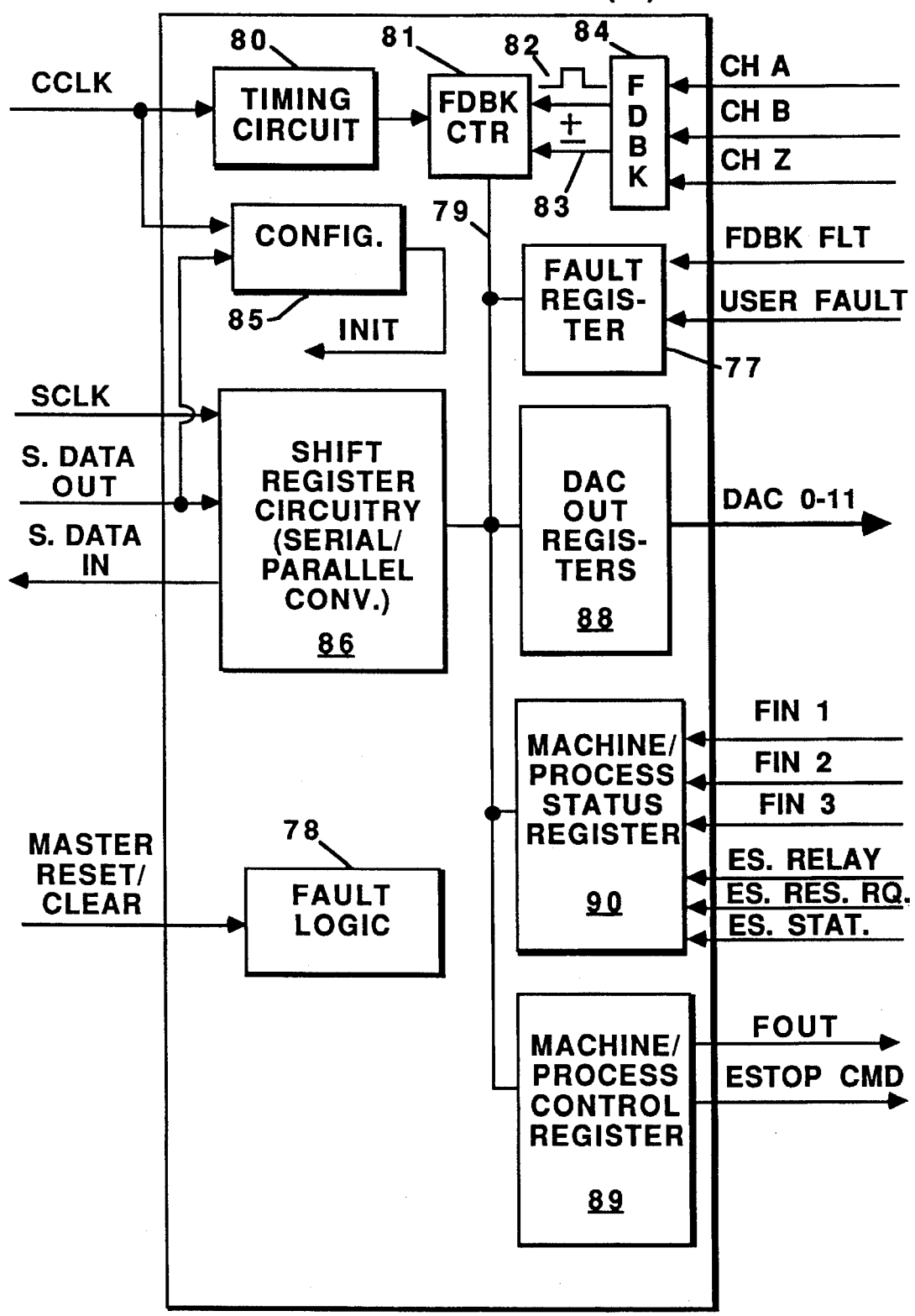

During configuration, certain configuration circuitry 77 internal to the first programmable logic circuit 29 generates a clock signal, CCLK, and other required bus timing signals at the rates required for transfer of configuration data. These times are different than for post-configuration data transfer. The CCLK signal is transmitted through the first optical coupling circuit 32 seen in FIG. 2 to configuration circuitry 85 in the second programmable logic circuit 37 as seen in FIG. 5. After configuration of the I/O module 15, the pin in the signal path from the configuration circuit 77 is switched to high impedance to allow a 1.25 MHz signal (the ENC_CLK signal) to be generated on the CCLK/ENC_CLK line by dividing signals on the 10M CLK line through the divide-by-8 circuit 74. The double connections to the CCLK/ENC_CLK line and the S. DATA OUT line permit a single pair of relatively faster speed optical coupler circuits 32 to be used for both configuration and post-configuration operations.

A second double connection is made to the S. DATA OUT line. The configuration circuitry 77 is connected and active to transmit data on the S. DATA OUT line during configuration. After configuration, this line is switched by internal logic circuitry in circuit 29, so that data from the shift register circuitry 74 is transmitted on the S. DATA OUT line.

The 1.25 Mhz signal is also an input to a shift clock and logic circuit 75. That circuit 75 generates a shift clock (SCLK) signal for shifting 24 bits of serial data out on the S. DATA OUT line during post-configuration operation. At the same time as data is being shifted out during control operations, 24 bits of serial data are also being received on the S. DATA IN line. This is converted to parallel data by shift register circuitry 74 and then transferred to the feedback registers 62, 63 and MACH/PROC status register 69. During configuration of logic circuits 29 and 37, data is sent only in one direction and is not returned on the S. DATA IN line.

A fault logic circuit 76 detects faults in any of the optical coupling circuits in interface 31 and generates a MASTER RESET/CLEAR signal for resetting the second programmable logic circuit 39. A watchdog timer circuit 60 connects to the fault logic circuit 76, and when a watchdog timeout is detected, a reset/clear signal is transmitted to the second programmable logic circuit. Other conditions that will generate a reset/clear are a halt signal from the processor 24, a fault detected during post-configuration serial data transfer, a fault detected on the second programmable logic circuit 37 or a power fail condition.

Referring next to FIG. 5, the second programmable logic circuit 37 is seen in more detail. The CCLK/ENC_CLK line is connected to two terminals, the first connecting to configuration circuitry 85 and the second connecting to a timing circuit 80 which feeds timing signals to the feedback counter 81. During configuration, the CCLK signal is routed to circuit 85. After configuration, the second terminal is switched to receive the 1.25 MHz ENC_CLK timing signals which are utilized to sample the position feedback data. A second double connection is accomplished internally for the S. DATA OUT line, so that during configuration, data is routed to the storage portion of the configuration circuitry 85, and after configuration, data is received in the shift register circuitry 86.

During configuration, data comes into the configuration circuitry 85 on the S. DATA OUT line (out being a direction relative to processor 24 and system processor 11). After configuration, the shift register circuit 86 receives the data on the S. DATA OUT line.

This data is in a 24-bit serial data format as discussed below. As data is being received, twenty-four bits of data are also being transferred on the S. DATA IN line.

The data transfer is synchronized by shift clock signals at a frequency of 250 kHz. transmitted on the SCLK line to the shift register circuitry 86 in FIG. 5. The shift register circuitry 86 converts between serial data sent across the isolation interface 31 and parallel data used by registers in the programmable logic circuit 37. Data bus 79 conveys parallel data between elements 81, 87, 88, 89, 90 and shift register 86.

The second programmable logic circuit 37 processes feedback position data during motion control operations and after configuration. The feedback counters 81 count up or down according the signals received on a pulse line 82 and a direction line 83 connecting it to a feedback decoding circuit 84. This circuit 84 converts CHANNEL A square wave signal, CHANNEL B square wave signal and CHANNEL Z marker pulses to a number of counts in one rotational direction or the other.

The second programmable logic circuit 37 also transmits data in digital-to-analog registers 88 on lines DAC 0–11 for conversion to analog output signals going to the servo drive. The second programmable logic circuit 37 also has a machine/process control register 89 and a machine/process status register 90. The machine/process status data register 90 receives three single-bit inputs of data FIN 1–FIN 3 representing the state of three 24-volt discrete DC input devices, and also receives several ESTOP STATUS inputs. The machine/process control register 89 transmits a bit of data on the FOUT line to control a 5-volt discrete DC output device, as well as an ESTOP CMD signal to put the I/O module in ESTOP. The second programmable logic circuit 37 also includes a fault logic circuit 78 that responds to the MASTER RESET/CLEAR signal to clear the present configuration from the circuit 37. The INIT line from configuration circuitry 85 goes back to the on-board processing circuitry 23 as shown in FIG. 2 and will inhibit configuration operations in response to certain conditions.

Figure 6:
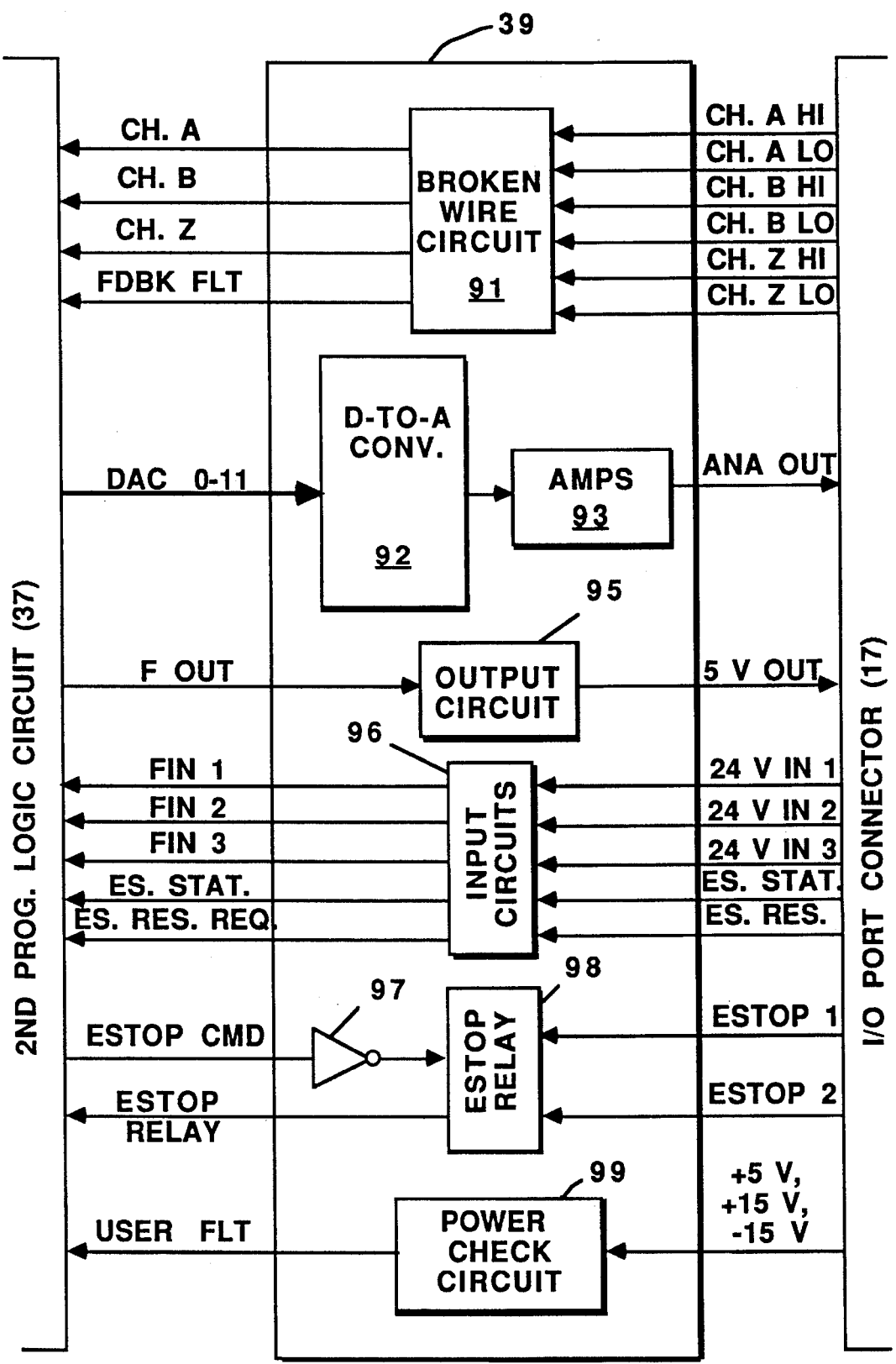

Referring to FIG. 6, the interface circuitry of FIG. 2 is seen in more detail. Six lines labeled CHANNEL A HI and LO, CHANNEL B HI and LO, and CHANNEL Z HI and LO connect to differential amplifiers in a broken wire detection circuit 91, which provides TTL output signals on a CHANNEL A line, a CHANNEL B line, a CHANNEL Z line, and, if a fault occurs, on a FDBK FAULT line. Lines DAC 0–11 connect to a digital-to-analog converter 92 which converts digital values to a +10 volt to −10-volt DC analog signal (ANA OUT) with the aid of two amplifiers 93 in series. Input and output signal conditioning circuits 95, 96 are provided for the discrete input and output signals, 5 V OUT and 24 V IN. The ESTOP CMD line connects through inverter 97 to an ESTOP RELAY 98 which drops out during an ESTOP (emergency stop) condition. An active ESTOP CMD signal closes the relay 98. The ESTOP RELAY STATUS line signals the state of the ESTOP RELAY 98. The ESTOP 1 and 2 lines are provided for connection to a pushbutton in an external ESTOP string. An ESTOP STATUS line and an ESTOP RESET REQ line are connected through I/O connector 17 to the ESTOP string, and bits of status data are transmitted through input circuits 96 to the second logic circuit 39. Finally there is a power check circuit 99, which generates an USER FAULT signal upon any loss of user power supply signals +5 volts, +15 volts and −15 volts.

Commercial circuits suitable for use in constructing the I/O module 15 as shown in FIGS. 2–6 are listed in Appendix A.

Having described the circuitry on the module, the following is a description the serial data transfer of system I/O data between circuits 29 and 37.

Figure 7:
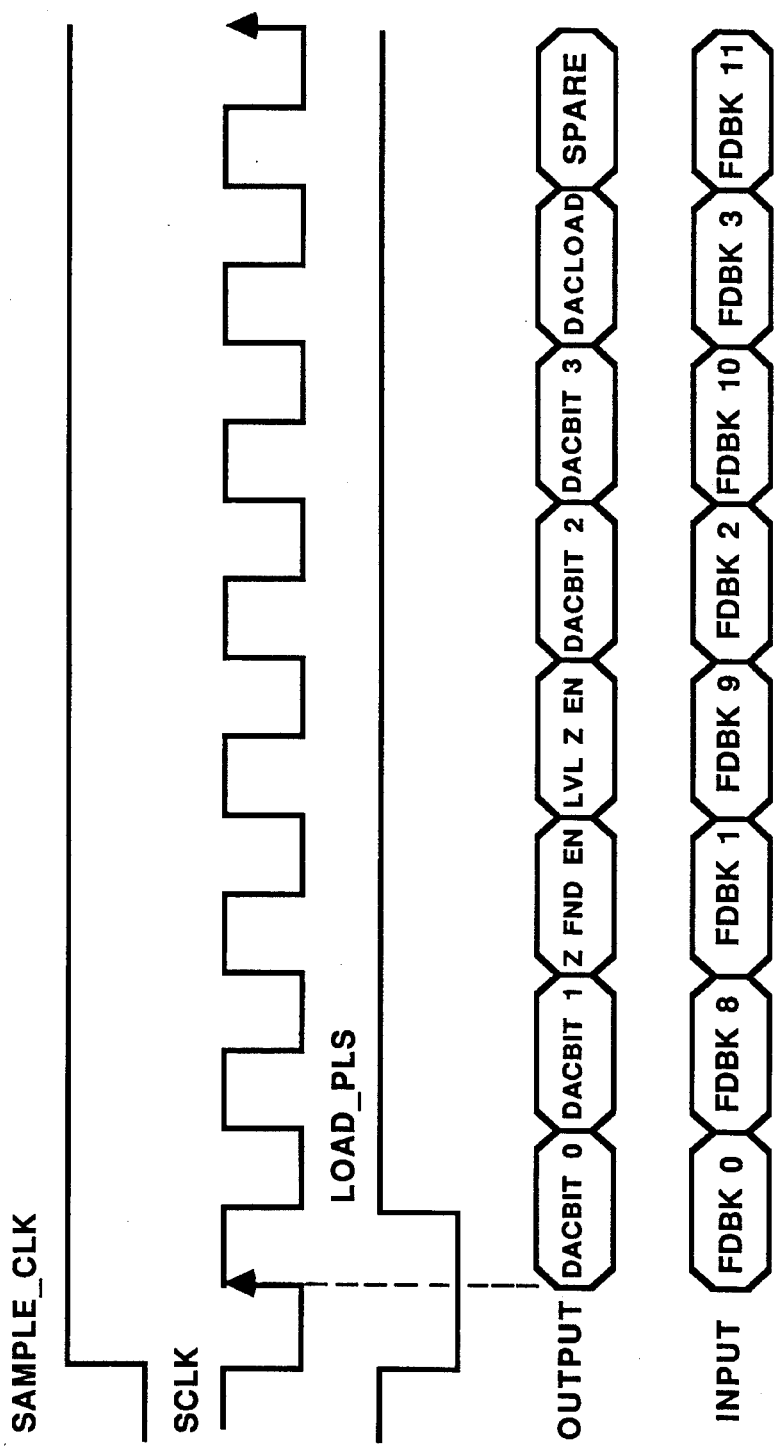
FIGS. 7–9 constitute a three-part timing diagram showing timing and protocol for the serial ring data transfer of the present invention.
Figure 8:
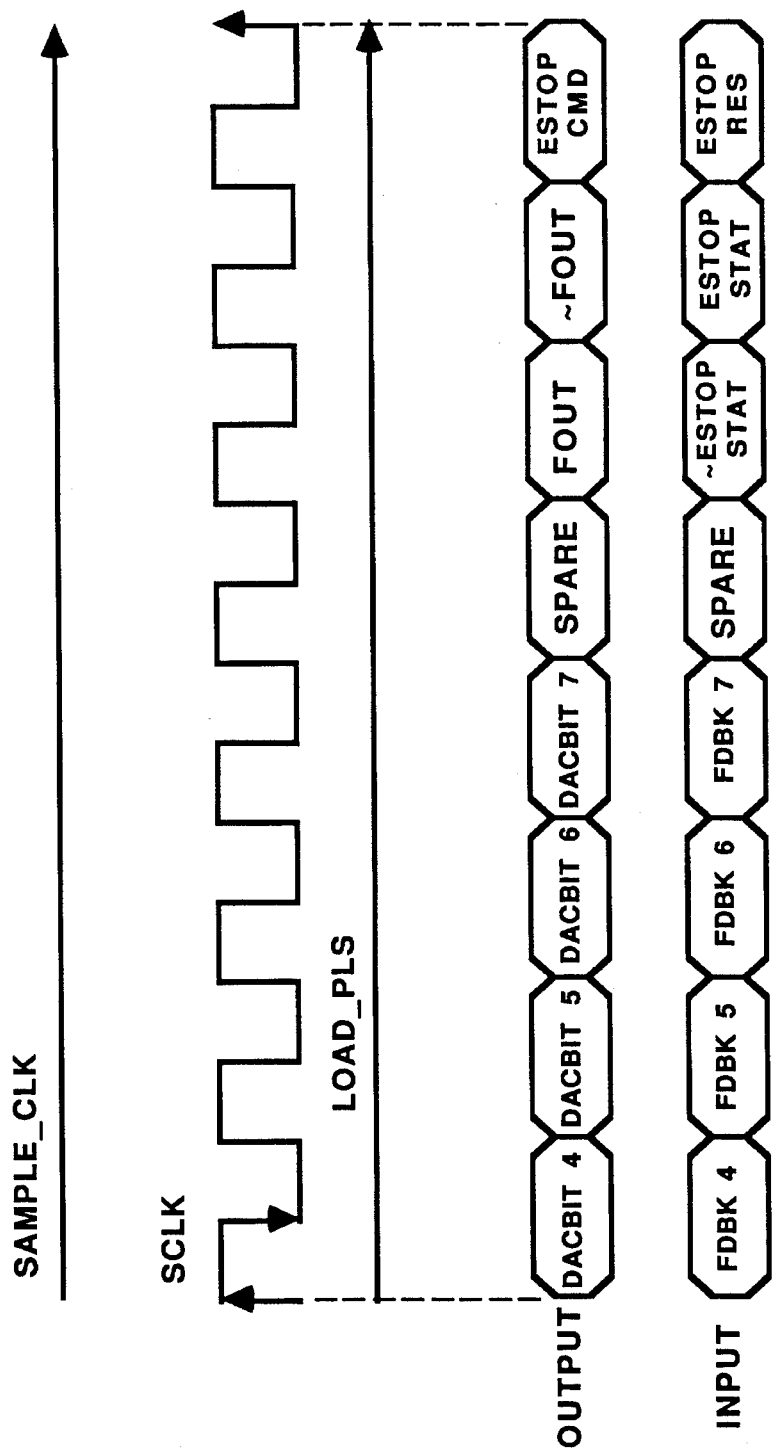
Figure 9:
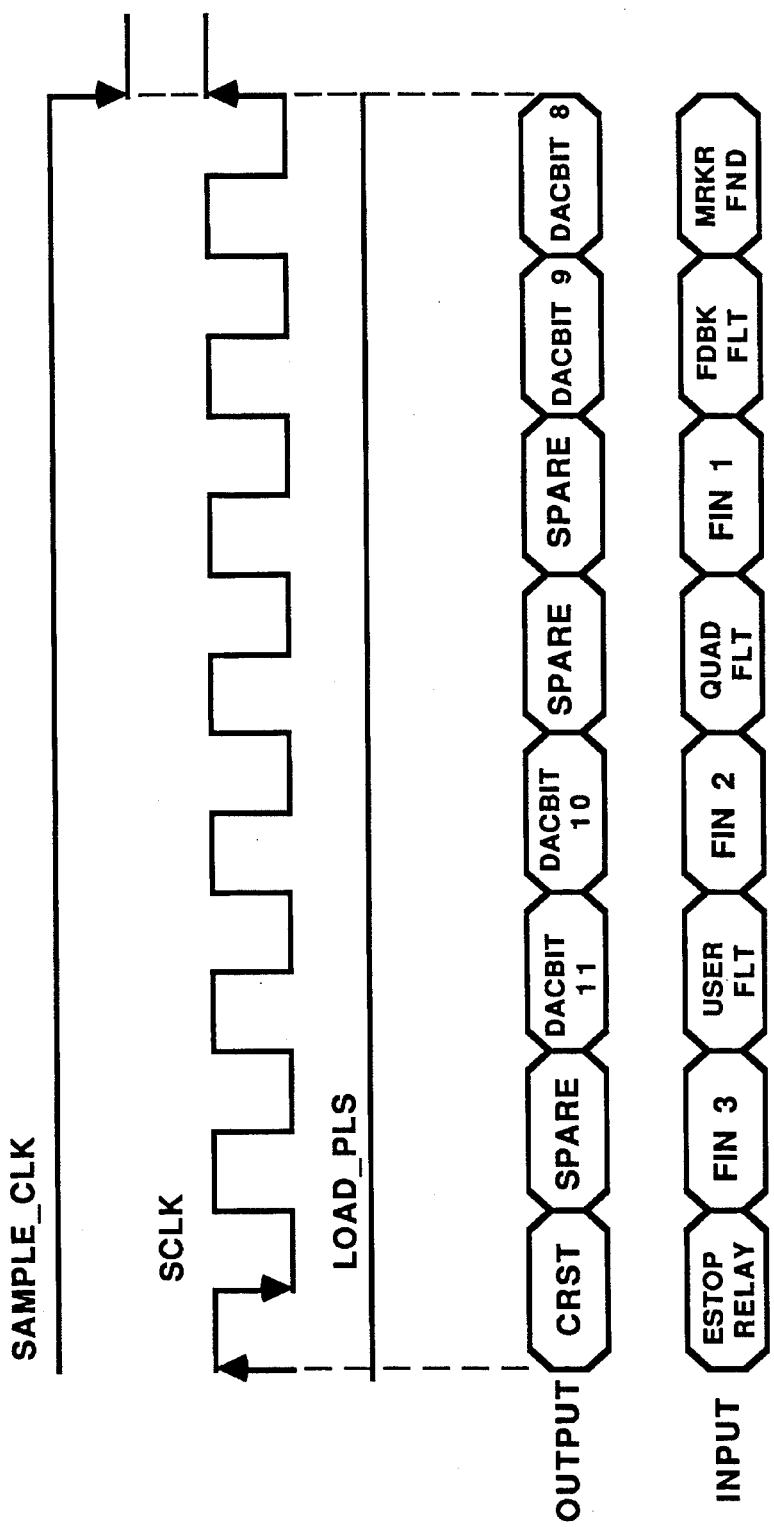

FIGS. 7–9 show the twenty-four bits of OUTPUT data which are transmitted from circuit 29 on the S. DATA OUT line and the twenty-four bits of INPUT data which are received on the S. DATA IN line. The same 24-bit shift register 74, seen in FIGS. 2 and 4, is used to send and receive these bits. As a first bit, DACBIT 0, is shifted out, another bit, FDBK 0, is shifted in from circuit 37. On the other side of the isolation interface 31, bit DACBIT 0 is shifted into 24-bit shift register 86 in FIGS. 2 and 5, as bit FDBK 0 is shifted out. The twenty-four bits transferred in each direction, as shown in FIGS. 7–9, are defined as follows:

TABLE 5

Data Sent from Circuit 29 to Circuit 37

| Bit | Label | Description |
|---|---|---|
| 1 | DACBIT 0 | Bit 0, Digital-to-Analog Output Data |
| 2 | DACBIT 1 | Bit 1, Digital-to-Analog Output Data |
| 3 | Z FND EN | Zero Found Enable, enables marker detection by inspection of Mrkr Fnd bit |
| 4 | LVL Z EN | Level Z Enable, enables zero of position counters when marker is detected |
| 5 | DACBIT 2 | Bit 2, Digital-to-Analog Output Data |
| 6 | DACBIT 3 | Bit 3, Digital-to-Analog Output Data |
| 7 | DACLOAD | Active when D-to-A data valid. |
| 8 | SPARE | Not Used |
| 9 | DACBIT 4 | Bit 4, Digital-to-Analog Output Data |
| 10 | DACBIT 5 | Bit 5, Digital-to-Analog Output Data |
| 11 | DACBIT 6 | Bit 6, Digital-to-Analog Output Data |
| 12 | DACBIT 7 | Bit 7, Digital-to-Analog Output Data |
| 13 | SPARE | Not Used |
| 14 | FOUT | Fast Output Control Bit |
| 15 | –FOUT | Complement of Fast Output Control Bit |
| 16 | ESTOP CMD | Closes On-board E-Stop relay. |
| 17 | CRST | Resets Position Counters. |
| 18 | SPARE | Not Used |
| 19 | DACBIT 11 | Bit 11, Digital-to-Analog Output Data |
| 20 | DACBIT 10 | Bit 10, Digital-to-Analog Output Data |

TABLE 5-continued

Data Sent from Circuit 29 to Circuit 37

| Bit | Label | Description |
|---|---|---|
| 21 | SPARE | Not Used |
| 22 | SPARE | Not Used |
| 23 | DACBIT 9 | Bit 9, Digital-to-Analog Output Data |
| 24 | DACBIT 8 | Bit 8, Digital-to-Analog Output Data |

TABLE 6

Data Sent from Circuit 37 to Circuit 29

| Bit | Label | Description |
|---|---|---|
| 1 | FDBK 0 | Bit 0, Position Feedback Data |
| 2 | FDBK 8 | Bit 8, Position Feedback Data |
| 3 | FDBK 1 | Bit 1, Position Feedback Data |
| 4 | FDBK 9 | Bit 9, Position Feedback Data |
| 5 | FDBK 2 | Bit 2, Position Feedback Data |
| 6 | FDBK 10 | Bit 10, Position Feedback Data |
| 7 | FDBK 3 | Bit 3, Position Feedback Data |
| 8 | FDBK 11 | Bit 11, Position Feedback Data |
| 9 | FDBK 4 | Bit 4, Position Feedback Data |
| 10 | FDBK 5 | Bit 5, Position Feedback Data |
| 11 | FDBK 6 | Bit 6, Position Feedback Data |
| 12 | FDBK 7 | Bit 7, Position Feedback Data |
| 13 | SPARE | Not Used |
| 14 | ~ESTOP STAT | Complement of Status of external E-Stop string. |
| 15 | ESTOP STAT | Status of external E-Stop string. |
| 16 | ESTOP RES | E-Stop reset request. |
| 17 | ESTOP RLY | Status of E-Stop relay. |
| 18 | FIN 3 | Fast Input, Bit 3 |
| 19 | USER FLT | Fault on User Side of Iso Interface |
| 20 | FIN 2 | Fast Input, Bit 2 |
| 21 | QUAD FLT | Quadrature Fault CH. A, CH. B signals |
| 22 | FIN 1 | Fast Input, Bit 1 |
| 23 | FDBK FLT | Broken wire detected |
| 24 | MRKR FND | Marker detected since last ring update. |

A SAMPLE_CLK signal shown in FIG. 7 is generated in each 1.6 millisecond interrupt period. The trailing edge of the SAMPLE_CLK pulse generates an interrupt signal on lines IPL 1–2 going from the interrupt control circuitry 61 in FIG. 4 to the processor 24 in FIG. 3.

The processor 24 must not access data in circuit 29 while data is being transferred across the isolation interface 31. In response to the 1.6 millisecond interrupt, the processor 24 will read and make a copy of the position feedback data (FDBK 0–FDBK 11), the machine/process status data and the fault data. After that, this data is read from memory by the processor 24 for further operations. The processor 24 also writes out the digital-to-analog servo command data (DACBIT 0–DACBIT 11) from memory on every third interrupt cycle. This data is written within the first of the time of the interrupt so as not to interfere with the serial data transfer across the isolation interface 31. If the processor 24 attempts to read data while a transfer is being made across the isolation interface, a fault will be generated, causing the processor 24 to shut down.

The SAMPLE_CLK pulse is the last 100 microseconds of this 1.6 millisecond period. When SAMPLE_CLK status goes high, the SCLK signal goes low and starts to generate a series of low and high pulses, such that each low pulse is 2 microseconds long and each high pulse in 2 microseconds long for a cycle of 4 microseconds. When the SAMPLE_CLK status first goes low, LOAD_PLS also goes low. This signal is transmitted to the serial-to-parallel shift register circuitry in the first circuit 29, which loads the shift register with 24 bits of system output data from DAC registers 64, 65. Following the next rising edge transition of the SCLK signal, bit DACBIT 0 is shifted out and FDBK 0 is shifted in during the 4-microsecond interval.

Over the next twenty-three 4-microsecond intervals the next 23 bits are transmitted in each direction across the isolation interface. As seen FIG. 9, on the rising edge of the 25th cycle, the SAMPLE_CLK signal goes low and the 1.6 millisecond interrupt is generated to the processor 24.

It should be noted in FIG. 8, that a complement is provided for one bit transmitted in each direction. In the system output direction, the ~FOUT bit is sent along with the FOUT bit. In the system input direction, the ~ESTOP STATUS bit is sent to circuit 29 with ESTOP STATUS bit. These bits are compared and checked after they are transmitted across the isolation interface 31, to detect any failure of the optical coupling circuits 32, 33 in sticking on transfer of only ones or only zeroes. A second fault check is made by "OR"ing all fault bits from the user side which are considered critical.

As shown in FIG. 9, there are three bits provided for detecting faults. The QUAD FAULT bit signals a fault in the phase relationship of the CH. A and CH. B encoded position signals. A USER FAULT bit signals a fault in the power lines on the user side. A FDBK FAULT bit signals detection of a broken wire.

This description has been by way of example of how the invention can be carried out. Those of ordinary skill in the art will recognize that various details may be modified in arriving at other detailed embodiments, and that many of these embodiments will come within the scope of the invention. Therefore to apprise the public of the scope of the invention and the embodiments covered by the invention the following claims are made.

APPENDIX A
Component Listing

| Description Name | Ref. No. | Commercial circuit |
|---|---|---|
| Processor | 24 | 68HC001 microprocessor available from Motorola Semiconductor |
| Decoding Circuit | 56 | 22V10 programmable logic array available from Cypress Semiconductor |
| PROM | 25 | 27C2M erasable, programmable read only memory available from Hitachi |
| Program RAM | 44 | 62256LP random access memory available from Hitachi |
| Gate | 46 | HC132 NAND gate available from Texas Instruments, Inc. |
| UART | 54 | 82050 universal asynchronous receiver/transmitter available from Intel Corp. |
| I/O RAM | 48 | 7164L random access memory available from Hitachi |
| Gate Array | 49 | A-B 2316-192-01 available from Allen-Bradley |
| Reset circuit | 47 | Two NAND gates from HC132 package and one OR gate from ALS09 package available from Texas Instruments and a passive network of resistors, capacitors and one diode. |
| First Programmable Logic Circuit | 29 | XC3030 3000-gate Logic Cell Array available from Xilinx |
| Second Programmable Logic Circuit | 37 | XC3020 2000-gate Logic Cell Array available from Xilinx, Inc. |

-continued

APPENDIX A
Component Listing

| Description Name | Ref. No. | Commercial circuit |
|---|---|---|
| Optical couplers | 32 | HCPL 2232 dual optical couplers from Hewlett-Packard |
| Optical couplers | 33, 34 | Two HCPL 2531 dual optical couplers from Hewlett-Packard |
| D-to-A Converter | 92 | One 7541A 12-bit digital-to-analog converter available from Maxim Integrated Circuits |
| Amplifiers | 93 | Two OP 77 operational amplifiers available from Analog Devices |
| Input circuits | 96 | Includes inverters from AC14 package of inverters available from National Semiconductor |
| Output circuit | 95 | Includes inverter from AC14 package of inverters available from National Semiconductor |
| power check circuit | 99 | ICL 7665 available from Maxim Integrated Circuits |

We claim:

1. A method for electrically isolating a first interface circuit and a second interface circuit having a first and second shift register respectively, the first and second interface circuits being connected by optical isolators, the method comprising the steps of:

(a) loading the first shift register with 24-bit output data;

(b) loading the second shift register with 24-bit input data;

(c) transmitting a clock signal through a first optical isolator to provide a common clock signal for the first and second interface circuits to be received by the first and second shift registers;

(d) clocking the output data from the first shift register, serially, in synchronism with the common clock signal, through a second optical isolator into the second shift register;

(e) simultaneously with step (d) clocking the input data from the second shift register, serially, in synchronism with the common clock signal, through a third optical isolator into the first shift register;

wherein the input data includes a fourteenth bit and a fifteenth bit that is the complement of the fourteenth bit and including the step of:

(f) if the fourteenth and fifteenth bits of the input data as received by the first shift register after step (e) are not complements to each other generating a fault signal indicating failure of the third optical isolator; and (g) if the fourteenth and fifteenth bits of the input data as received by the first shift register after step (e) are complements to each other not generating a fault signal indicating failure of the third optical isolator.

2. A method for electrically isolating a first interface circuit and a second interface circuit having a first and second shift register respectively, the first and second interface circuits being connected by optical isolators, the method comprising the steps of:

(a) loading the first shift register with 24-bit output data;

(b) loading the second shift register with 24-bit input data;

(c) transmitting a clock signal through a first optical isolator to provide a common clock signal for the first and second interface circuits to be received by the first and second shift registers;

(d) clocking the output data from the first shift register, serially, in synchronism with the common clock signal, through a second optical isolator into the second shift register;

(e) simultaneously with step (d) clocking the input data from the second shift register, serially, in synchronism with the common clock signal, through a third optical isolator into the first shift register;

wherein the output data includes a fourteenth bit and a fifteenth bit that is the complement of the fourteenth bit and including the step of:

(f) if the fourteenth and fifteenth bits of the output data as received by the second shift register after step (d) are not complements to each other generating a fault signal indicating failure to the second optical isolator; and (g) if the fourteenth and fifteenth bits of the output data as received by the second shift register after step (d) are complements to each other not generating a fault signal indicating failure of the second optical isolator.

* * * * *

UNITED STATES PATENT AND TRADEMARK OFFICE
CERTIFICATE OF CORRECTION

PATENT NO. : 5,555,438

DATED : September 10, 1996

INVENTOR(S) : Blech et al.

It is certified that error appears in the above-identified patent and that said Letters Patent is hereby corrected as shown below:

Col. 11, line 53          "first of the time" should be --first 20% of the time

Signed and Sealed this

Twenty-eighth Day of January, 1997

Attest:

BRUCE LEHMAN

Attesting Officer     Commissioner of Patents and Trademarks